United States Patent Office 3,590,085
Patented June 29, 1971

3,590,085
3,5-DI-t-BUTYL - 4 - HYDROXYBENZYLTHIO-2,3-DIHYDROXYPROPANE AND THE METHYL AND ETHYL ETHERS THEREOF
Harry Braus, Springdale, and Jay R. Woltermann, Cincinnati, Ohio, assignors to National Distillers and Chemical Corporation, New York, N.Y.
No Drawing. Original application Apr. 7, 1967, Ser. No. 629,112. Divided and this application July 22, 1969, Ser. No. 851,536
Int. Cl. C07c *149/36;* C08f *45/54*
U.S. Cl. 260—609  2 Claims

ABSTRACT OF THE DISCLOSURE

Organic materials can be stabilized with a compound having the formula

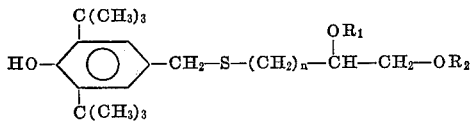

$n$ is a positive integer ranging from 1 to 4; and $R_1$ and $R_2$ may be the same or different and each is selected from the group consisting of H, an alkyl radical having from 1 to 22 carbon atoms, and

wherein $R_3$ is an alkyl radical having from 1 to 22 carbon atoms such as 3,5-di-t-butyl-4-hydroxybenzylthio-2,3-propanediol.

---

This invention relates to novel compounds and to their use as stabilizers for organic materials. More particularly, this invention is concerned with the use of these compounds as stabilizers and antioxidants for olefin polymers and to the polymer compositions stabilized therewith.

A rapidly expanding industry utilizing polyolefin resins has created a need for stabilizers that will render the finished articles of manufacture more useful, more versatile in application, and more nearly permanent. Polymers of aliphatic olefins have a combination of properties, such as high resistance to stress cracking, high tensile strength, and stability under load, that makes them useful in the manufacture of pipe, film, wire, coatings, or various molded objects such as bottles and the like.

These polyolefins, however, are subject to considerable degradation at the high temperatures that are required in their processing or that may be encountered by the finished articles. They may also be degraded by chain cleavage resulting from oxidation or attack by acids. The molecular breakdown which occurs in these polymers during fabrication is usually evidenced by increased brittleness at low temperature and reduced tensile strength and dielectric properties.

It is customary to incorporate small amounts of stabilizers into the polymer to improve the resistance thereof to thermal and oxidative degradation, such as various amines, diaryl sulfides, phenolic compounds, organic phosphites, and the like. Many of the known stabilizers, however, do not provide the required stabilizing effect, while others impart color to the stabilized compositions.

In accordance with this invention, it has been found that a variety of organic materials can be stabilized against thermal and oxidative degradation by incorporating into the polymer composition a small amount of compound having the generic formula

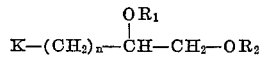

wherein

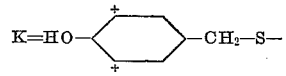

$n$ is a positive integer ranging from 1 to 4; and $R_1$ and $R_2$ may be the same or different and each is selected from the group consisting of H, an alkyl radical having from 1 to 22 carbon atoms, and

wherein $R_3$ is an alkyl radical having from 1 to 22 carbon atoms.

The resulting stabilized compositions can be processed under conditions of elevated temperature and mechanical working without substantial increase in the melt flow rate and without important color change.

Specific examples of the stabilizers of this invention include such compounds as 3,5-di-t-butyl-4-hydroxybenzylthio-2,3-propanediol having the formula

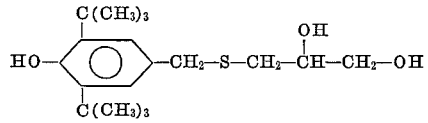

3,5-di-t-butyl-4-hydroxybenzylthio-2,3 - dimethoxypropane and 3,5-di-t-butyl-4-hydroxybenzylthio-2,3 - diethoxypropane.

Although this invention will be described with regard to the use of the novel compounds as stabilizers for polyolefins, it is to be understood that the compounds are suitable also as stabilizers for other materials, such as elastomers, including both natural and synthetic rubbers; synthetic resins, e.g., vinyl resin, polystyrene, polyamides, polyacetals, and polyesters; fats; gasolines; waxes; soaps; oils; greases; and so forth.

The materials with which this invention will be illustrated are the normally solid homopolymers and copolymers of aliphatic olefins having from 2 to 8 carbon atoms per molecule, such as ethylene, propylene, 1-butene, isobutylene, 2-butene, 1-pentene, and 1-hexene, and mixtures thereof.

In general the amount of agent to be added to the polyolefin depends upon the degree and kind of stabilization desired. The amount of antioxidant can vary from about 0.001 to about 5 percent, based on the weight of the polyolefin, with amount of approximately 0.05 to 0.5 percent being preferred. As a rule, it is preferred to use the minimum amount required to achieve the desired results.

The compounds of this invention can be mixed with the polyolefin in any suitable manner that will effect thorough distribution and dispersion. This can be accomplished in equipment suitable for mixing solids, as by milling the polyolefin with the additive on heated rolls such as are used in the compounding of rubber or on other suitable milling or mixing equipment, such as for example a Banbury mixer or conventional rubber mill. Instead of adding the stabilizing agent to the polymer in the solid or molten state, it can be added to a solution or suspension of polymer in an organic solvent or to an aqueous dispersion thereof and the volatile solvent subsequently removed by vaporization.

The antioxidants of this invention may be supplemented by small amounts of finely dispersed particles of carbon black to shield the polyolefin from the deleterious degradative effects of ultraviolet radiation, thereby improving its resistanec to light deterioration. Carbon black suitable for use herein includes both activated and unactivated types, such as channel carbon black, furnace carbon black, animal or vegetable carbon black, thermal carbon black, light lamp blacks, acetylene blacks, and the like, and carbon blacks activated in the presence of such materials as oxygen, sulfur, or selenium. The average particle size of carbon black used herein should be below about 1000 angstroms and preferably below about 200 angstroms, so as to ensure a uniform dispersion of the carbon black through the polymer. Amounts of carbon black within the range of about 0.5 to 5 percent by weight of the polymer, and preferably about 0.1 to 3 percent, are satisfactory. For some polyethylene applications, carbon black concentrations of up to about 50 percent by weight can be present, especially where partially conductive polyethylene-carbon black compounds are employed.

The preparation of the novel stabilizers and their use in polyolefin resin compositions are illustrated by the examples which follow. It is to be understood, however, that these examples are given solely for the purpose of illustration and that the invention is not to be regarded as being limited to any of the specific materials or conditions recited therein except as set forth in the appended claims.

EXAMPLE I 9.2 grams of sodium (0.4 atom) was dissolved in 20 ml. of ethanol in a 500-ml. Erlenmeyer flask equipped with a reflux condenser. When the solution was complete, the flask was cooled to 10° C. and 45 grams of 3-mercapto-1,2-propanediol (0.42 M) was quickly added. The contents, sodium mercaptide, were placed in a dropping funnel.

Into a 3-necked 3-liter Morton flask equipped with a stirrer, $N_2$ inlet, thermometer, reflux condenser, and dropping funnel was weighed 101.9 grams of the 3,5-di-t-butyl-4-hydroxybenzyl chloride (0.4 M), prepared by the method disclosed by N. P. Neureiter in J. Org. Chem. 28, 3486–90 (1963), dissolved in about 100 ml. of ethanol. The flask was heated to 60° C., and the sodium mercaptide was added dropwise at a fairly rapid rate. Stirring was continued for about one half hour at 60° C. While still warm, the solution was filtered to remove the NaCl which was recovered in stoichiometric amounts (0.4 M). The filtrate was distilled under water pump vacuum to remove the alcohol.

The product, identified as 3,5-di-t-butyl-4-hydroxybenzylthio-2,3-propanediol, was a glassy material.

*Analysis.*—Calculated (percent): C, 66.21; H, 9.30; S, 9.80. Found (percent): C, 66.39; H, 9.40; S, 9.63.

A satisfactory antioxidant should hold the chemical and physical properties of the original organic material during an accelerated oxidation testing procedure, generally up to three hours' duration. For the following runs, the test procedure consisted of milling one pound of polyethylene in air on a two-roll laboratory mill having a front roll speed of 25 r.p.m. and a back roll speed of 35 r.p.m. with a distance between the two rolls adjusted to maintain a uniform rolling back in the nip and a mill temperature of 320° F. After the polymer started to melt, 300 p.p.m. of the antioxidant was added. Samples (75 grams) were taken after 5, 30, 60, 90, and 180 minutes, and melt index, weight percent carbonyl, and oxidation induction time were determined. Oxidation induction time was determined by Differential Thermal Analysis (DTA), indicating the degree of oxidation resistance. The test involves oxidation of the polymer at 392° F. and 100 percent oxygen. The analysis measures the length of the time before oxidation starts. The melt index demonstrates the holding characteristics for physical properties of the polymer; the carbonyl values, the holding of the chemical properties.

| | Melt Index ($MI_{10}$) after— | | | | | Percent C–O after— | | | | | DTA, min. |
|---|---|---|---|---|---|---|---|---|---|---|---|
| | 5 min. | 30 min. | 60 min. | 90 min. | 180 min. | 5 min. | 30 min. | 60 min. | 90 min. | 180 min. | |
| Sample: | | | | | | | | | | | |
| A*  | 4.8 | 3.7 | 3.4 | 3.6 | 0.4 | .108 | .018 | .022 | .027 | .311 | 3.3 |
| B*  | 1.6 | 2.8 | 4.3 | 4.7 | 5.1 | .013 | .14 | .16 | .23 | .70 | <1 |

* A is polyethylene+3,5-di-t-butyl-4-hydroxybenzylthio-2,3-propanediol; B is polyethylene with no stabilizer.

EXAMPLE II

As can be seen from the above data, polyethylene with no stabilizer (Sample B) shows poor mill stability and high carbonyl formation at a fast rate. The polyethylene Sample A containing the same polyethylene as Sample B plus the novel stabilizing compound of this invention is seen to have retained its chemical and physical properties as judged by the data for melt index, weight percent of C=O, and oxidation induction time (DTA), thus demonstrating the effectiveness of the compound of this invention as a stabilizer.

What is claimed is:

1. A compound having the formula:

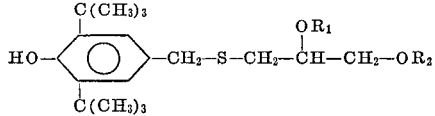

wherein $R_1$ and $R_2$ are each hydrogen, methyl, or ethyl.

2. 3,5-di-t-butyl-4-hydroxybenzylthio-2,3-propanediol.

References Cited

UNITED STATES PATENTS 3,330,804  7/1967  O'Shea _____ 260—45.95

CHARLES B. PARKER, Primary Examiner

D. R. PHILLIPS, Assistant Examiner

U.S. Cl. X.R.

252—404; 260—45.7, 398.5, 399, 488